Patented Sept. 25, 1934

1,974,744

UNITED STATES PATENT OFFICE 1,974,744

FINISH REMOVER COMPOSITION

Gustave Klinkenstein, Newark, N. J.

No Drawing. Application June 10, 1929,
Serial No. 369,924

5 Claims. (Cl. 87—5)

This invention relates, generally, to lacquer, paint and varnish removers, and the invention has reference, more particularly, to a novel remover composition incorporating a cellulose compound in a mixture of solvents and which is described in U. S. Patent #1,653,009 issued to Irwin W. Humphrey.

The invention has for its principal object to provide a novel remover composition that is effective for readily attacking and dissolving paints, lacquers or varnishes and which is as readily removed from the treated surfaces after use, the composition being so compounded that any traces of the same remaining after its removal from a treated surface will not adversely affect the adhering of a later applied lacquer, paint or varnish coating, and to this end the novel remover has incorporated therein a suitable cellulose compound and preferably cellulose acetate which serves as a blanketing agent and performs the function of retarding the rate of evaporation of the solvent constituents of the applied remover, so that such constituents may continue their solvent action for the desired time duration, thereby eliminating the use of waxes or alkalies commonly employed in removers for retarding evaporation, which substances are subject to the serious objection that slight traces of the same remaining in grooves or crevices destroy the adhering qualities of later applied lacquer, paint or varnish coatings. Other suitable cellulose compounds which may be used in place of cellulose acetate are any of the cellulose esters or cellulose ethers, all of which provide the protective film desired for preventing too rapid evaporation of the volatile solvents employed in the novel composition of this invention.

Another object of the present invention lies in the provision of a remover composition of the above character having powerful penetrating and solvent qualities and employing a homogeneous solvent mixture comprising, preferably acetone or other suitable ketone as ethyl methyl ketone, ethyl acetate or other ester, such as methyl acetate and ethyl lactate, denatured alcohol or other alcohol, such as methyl alcohol, benzol or other aromatic hydrocarbon, such as toluol and xylol, and oxidized pine oil, which may be obtained in the open market under the name of Hercosol, manufactured by the Hercules Powder Company.

A plasticizer, preferably in the form of diethyl phthalate, is incorporated in the composition for maintaining the homogeneity, wetness and softness of the body of the remover for a long time after the same has been applied to a surface to be treated, whereby the liquid solvents are uniformly distributed as well as protected against evaporation until they have effectively dissolved or loosened the coating of the surface treated. Various plasticizers such as di-butyl phthalate, di-amyl phthalate, di-butyl tartrate, tricresyl phosphate, triphenyl phosphate, or other soluble organic compounds of low vapor pressures may be employed in place of diethyl phthalate if desired.

As an example of a remover composition embodying the principles of the present invention, the ingredients are mixed together in the following proportions by volume:—

| | Parts |
|---|---|
| Acetone | 35 |
| Ethyl acetate | 15 |
| Denatured alcohol | 10 |
| Benzol | 10 |
| Oxidized pine oil | 10 |
| Diethyl phthalate | 20 |
| Cellulose acetate | 4 |

The preferred manner of preparing the composition is by intermixing the several solvents in the relative proportions called for in the above table and then dissolving the cellulose acetate therein by agitation.

It is to be understood that a similar proportion of a cellulose ester or cellulose ether such as ethyl cellulose ether may be used in lieu of cellulose acetate in the above table.

The resulting novel remover composition is highly effective in use for expeditiously softening and removing all types of lacquers, paints and varnishes owing to the admixture of solvents used and the manner of distributing them throughout the mass of the same while at the same time protecting them against too rapid evaporation.

While there is given above an illustrative table of the relative proportions of the several ingredients of the remover composition, it will be understood that variation may be made within reasonable limits. For example, the relative proportions of the several solvents used may be varied in accordance with the type of lacquer, paint or varnish that it is desired to remove. When the remover is to be employed largely on nitrocellulose and shellac coatings for instance, the relative proportions of ethyl acetate and alcohol may be increased while keeping the quantities of the other ingredients the same. The relative proportion of the cellulose compound may be varied while retaining the relative proportions of the other ingredients the same, whereby the viscosity of the resulting composition is correspondingly varied. Thus, by increasing the cellulose compound content, the remover composition is rendered more viscous, thereby enabling the same to be satisfactorily applied to vertical and other surfaces from which a liquid normally tends to drain readily. Likewise, by decreasing the cellulose compound content, the resulting remover composition will flow more freely when applied as by a brush or spray gun for example, to horizontal surfaces. Changes in the quantities of the other ingredients within reasonable limits may also be made while still attaining the purposes and function of the composition within the scope and spirit of this invention.

It will be apparent that the novel remover composition of this invention may be employed as a masking compound, which when applied to surfaces will prevent the adhesion thereto of lacquers, paints or varnishes.

What is claimed is:—

1. A lacquer, paint and varnish remover composition comprising a mixture of the herein named ingredients in the approximate proportions by volume as follows:—

|  | Parts |
|---|---|
| Acetone | 35 |
| Ethyl acetate | 15 |
| Denatured alcohol | 10 |
| Benzol | 10 |
| Oxidized pine oil | 10 |
| Diethyl phthalate | 20 |
| Cellulose acetate | 4 |

2. A lacquer, paint and varnish remover composition comprising, a major portion of a solvent mixture consisting of acetone, ethyl acetate, denatured alcohol, benzol and oxidized pine oil, an organic softener material of low vapor pressure consisting of one of the group, diethyl phthalate, di-butyl phthalate di-amyl phthalate, di-butyl tartrate, tricresyl phosphate and triphenyl phosphate, and cellulose acetate as an evaporation retarding material.

3. A lacquer, paint and varnish remover composition comprising, a solvent softener in the form of diethyl phthalate, a blanketing agent in the form of cellulose acetate, and a predominating proportion of a solvent mixture consisting of one of the two ketones, acetone and ethyl methyl ketone, one of the group of normally liquid esters, ethyl acetate, methyl acetate and ethyl lactate, denatured alcohol, an aromatic hydrocarbon and oxidized pine oil.

4. A lacquer, paint and varnish remover composition comprising, a major portion of a solvent mixture consisting of acetone, ethyl acetate, denatured alcohol, benzol and oxidized pine oil, a minor portion of diethyl phthalate serving as a solvent softener and a relatively small portion of cellulose acetate serving as a film forming agent.

5. A lacquer, paint and varnish remover composition comprising, substantially eighty parts of a solvent mixture consisting of acetone, ethyl acetate, denatured alcohol, benzol and oxidized pine oil, twenty parts of a solvent softener in the form of diethyl phthalate and four parts of a film forming agent in the form of a cellulose acetate.

GUSTAVE KLINKENSTEIN.